Figure 8:
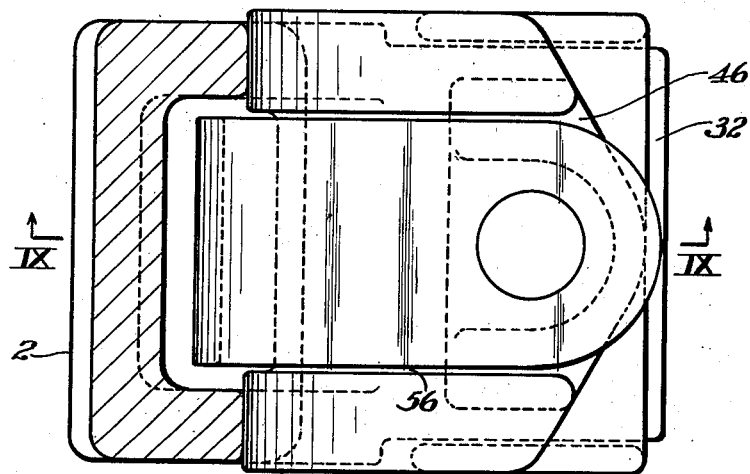

April 30, 1940.  F. SCHAEFER  2,199,117
BRAKE HANGER DAMPENER
Filed June 22, 1938　　4 Sheets-Sheet 1
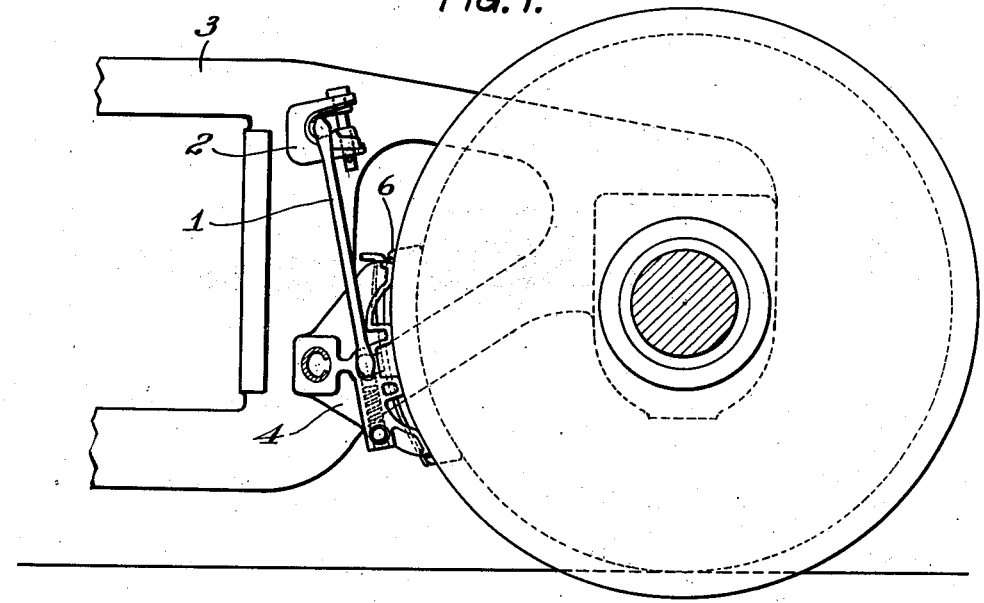
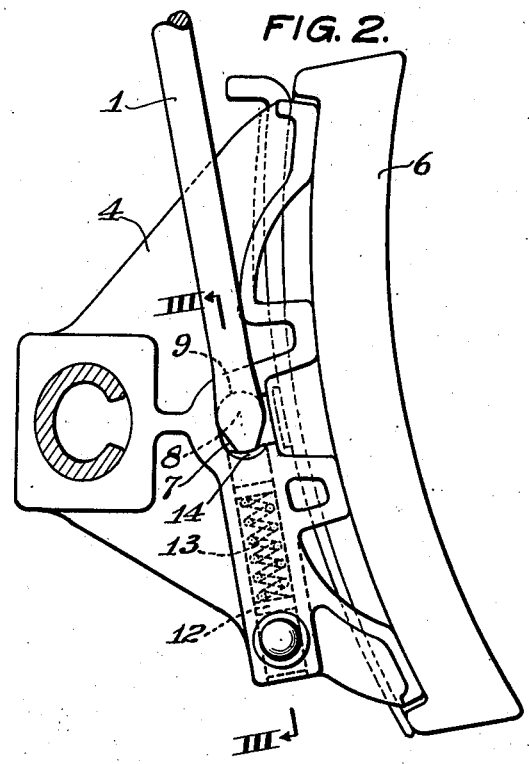
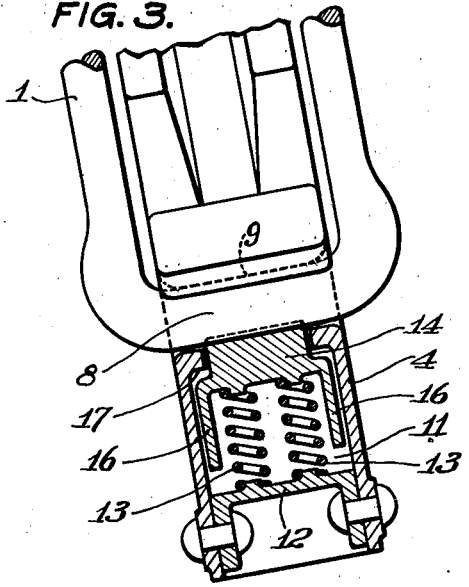
WITNESSES
A B Wallace
V. A. Peckham
INVENTOR.
Frederic Schaefer
BY Brown, Critchlow & Flick
his ATTORNEYS.

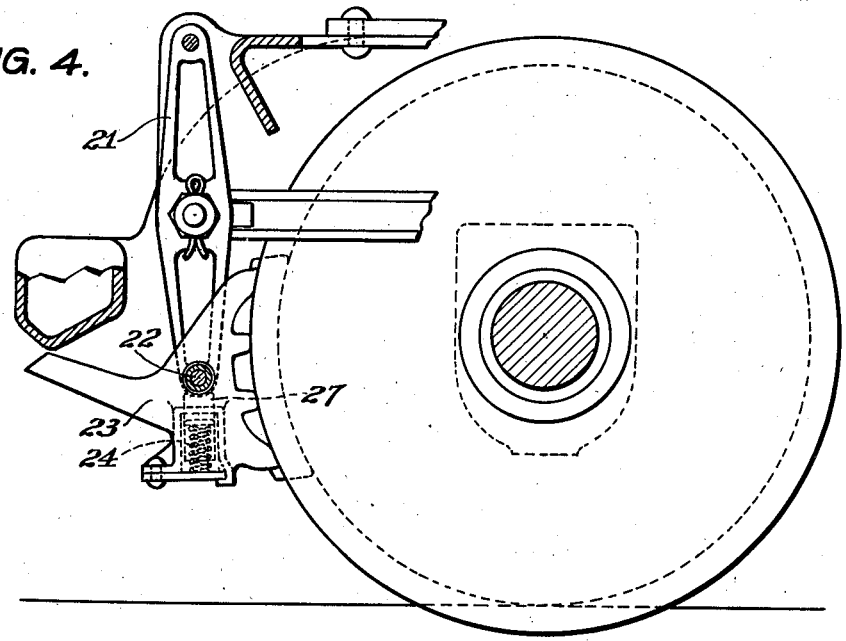
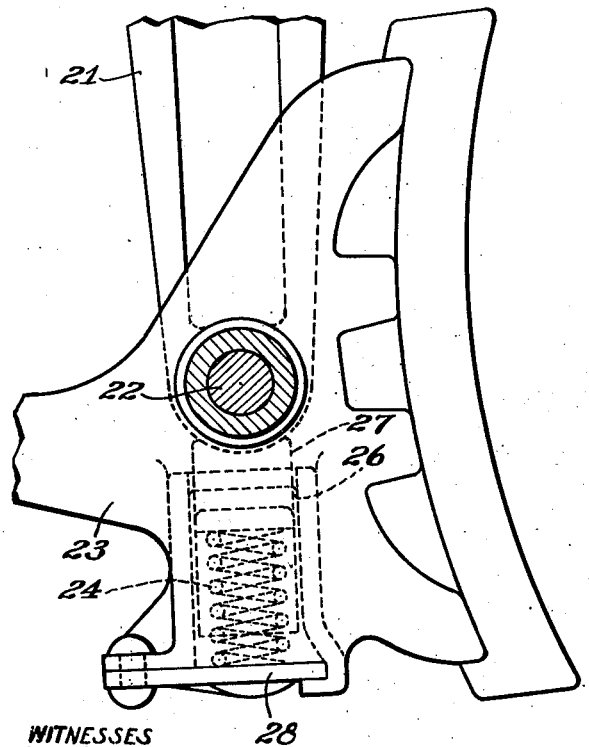
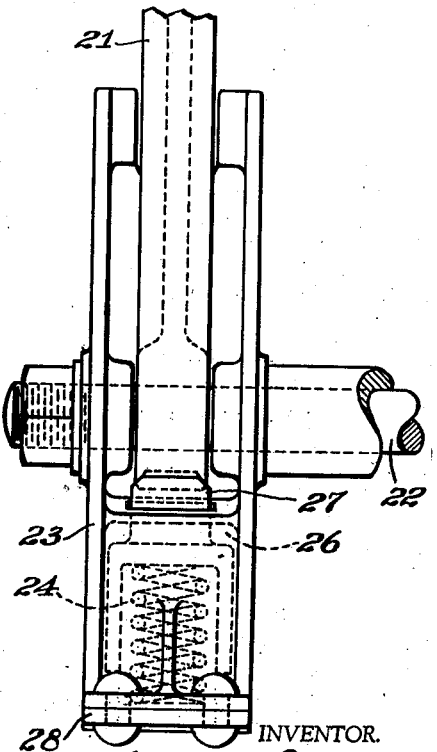

Patented Apr. 30, 1940

2,199,117

UNITED STATES PATENT OFFICE 2,199,117

BRAKE HANGER DAMPENER

Frederic Schaefer, Pittsburgh, Pa.

Application June 22, 1938, Serial No. 215,154

9 Claims. (Cl. 188—209)

This invention relates to railway brake rigging, and more particularly to means for dampening the vibration of brake hangers.

Railway brake hangers used with freight cars are generally connected to truck frame brackets through the medium of plates or shoes mounted in the brackets for receiving the wear resulting from movements of the hangers therein. As these shoes are intended to be replaceable when worn, it is highly desirable that they be readily insertable into and removable from the cast truck frame brackets. The plate-receiving openings in these brackets vary somewhat in size, and because of this variation in size the wear-plates must be of a size to enter the smallest bracket openings encountered. Accordingly, in many cases the plates fit loosely in the bracket openings, allowing them to vibrate and rattle. This causes the engaging surfaces of the brackets and shoes to wear rapidly, thereby permitting greater relative movements and consequently greater wear. Even in cases where the wear-plates fit snugly in the bracket openings when first inserted, they eventually work loose and move around in those openings. For similar reasons the upper cross member of a brake hanger vibrates and wears on its wear-plate seat.

Brake hangers, whether of the type used for freight cars or for passenger cars, are provided at their lower ends with cross members by which brake heads are supported. These cross members are disposed in openings in the brake heads, and here again it is virtually impossible to provide a snug fit. Consequently, the vibration between hangers and heads causes rapid wear at their points of connection.

It is among the objects of this invention to provide means for dampening or substantially eliminating vibration of a brake hanger on the surfaces against which it wears, whether those surfaces be wear-plates or brake heads. More specific objects are to provide a wear-plate which can be easily inserted into and removed from bracket openings and which is tightly held in place in such brackets at all times, to provide means for firmly holding the upper cross member of a brake hanger on its seat in the wear-plate, and to likewise hold a brake head down on the cross member of the brake hanger that supports it.

According to this invention a wear-plate provided with a brake hanger seat is mounted in the usual manner in a bracket projecting laterally from a railway truck frame, resilient means, preferably in the form of a metal spring plate, is disposed in the opening between the bracket jaws where it is yieldingly held between the upper wall of the opening and the top of the brake hanger cross member mounted on the hanger seat. This resilient means thereby presses the brake hanger cross member against its seat, and through the medium of the cross member presses or biases the wear-plate against the lower wall of the bracket opening to prevent wear of the engaging surfaces due to vibration. The wear-plate is preferably U-shaped with an opening in its upper portion through which the resilient means extends. A brake head is supported by the lower cross member of the hanger in the usual manner. That is, the head is provided with a transverse opening that receives the cross member. Resilient means is associated with the head for holding the head down on the cross member. Preferably, the head is provided below the hanger with a recess which is open at its upper end. Resilient means, such as a coil spring, is compressed in this recess between the hanger and head to bias the upper wall of the head's transverse opening down against the upper or inner bearing surface of the cross member of the hanger.

Figure 7:
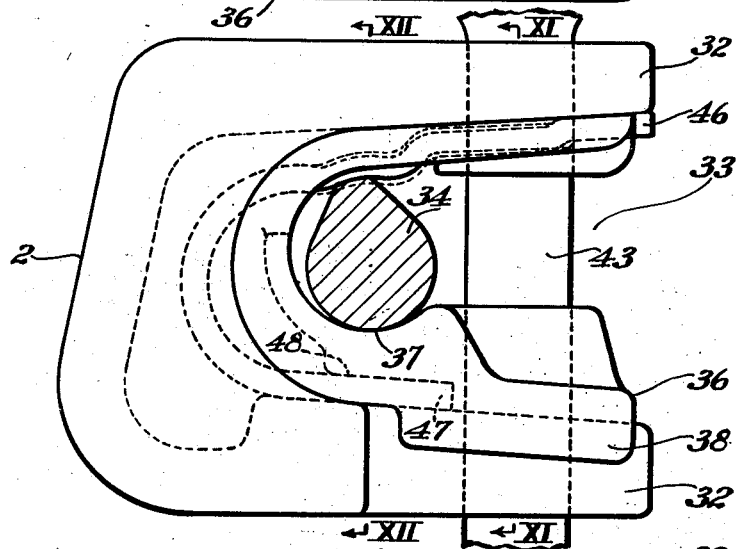
Figure 9:
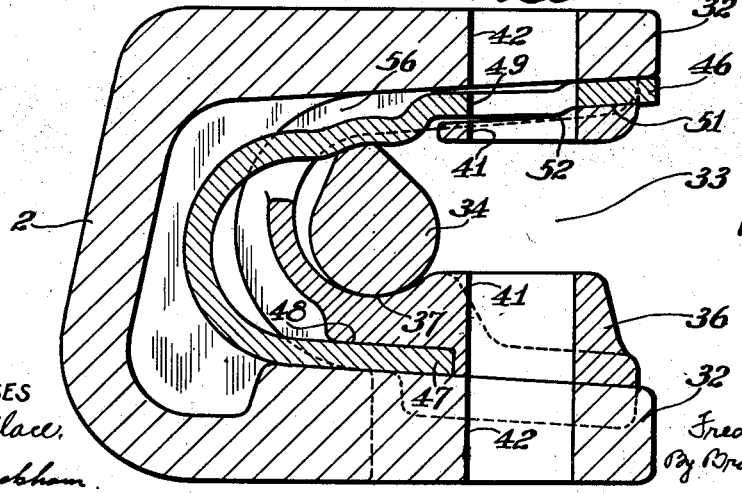
Figure 10:
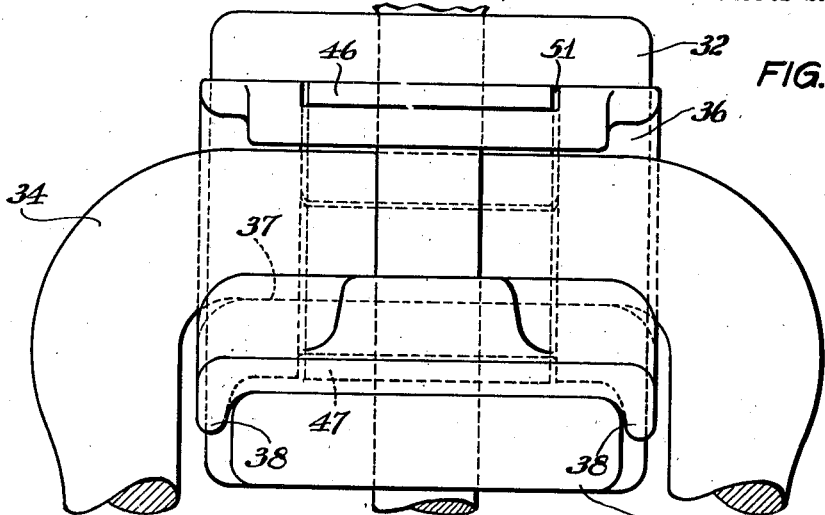
Figure 11:
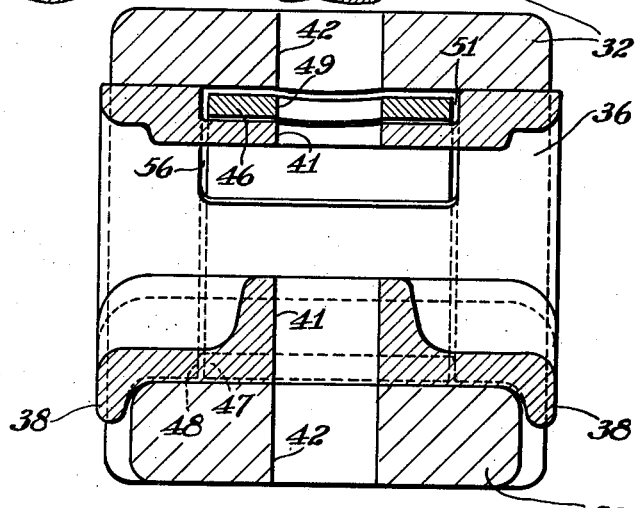
Figure 12:
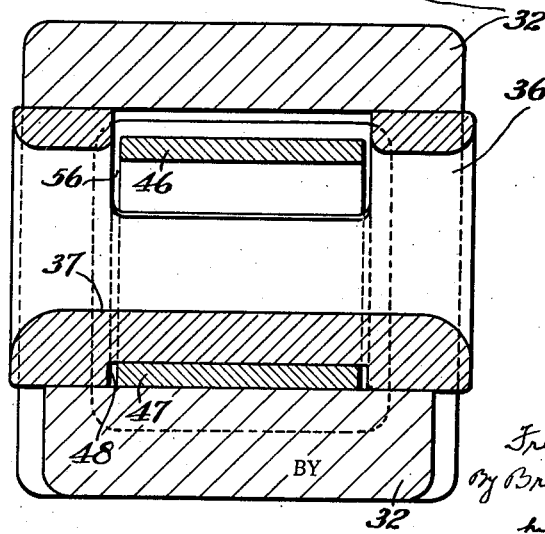

The invention is illustrated in the accompanying drawings in which Fig. 1 is a fragmentary view of a freight car truck provided with my hanger dampening means; Fig. 2 is an enlarged side view of the brake head assembly; Fig. 3 is a transverse section, taken on the line III—III of Fig. 2, of the dampener in the brake head; Fig. 4 is a fragmentary view of a passenger car truck showing a modification of this invention; Fig. 5 is an enlarged side view of the brake head assembly used with the passenger car truck; Fig. 6 is an end view of the brake head as viewed from the left in Fig. 5; Fig. 7 is an enlarged side view of a brake hanger bracket in which my wear-plate assembly is mounted; Fig. 8 is a plan view of the wear-plate assembly mounted in a bracket, the upper portion of which has been cut away; Fig. 9 is a vertical section taken on the line IX—IX of Fig. 8; Fig. 10 is a front view of the bracket and wear-plate assembly; and Figs. 11 and 12 are vertical sections taken on the lines XI—XI and XII—XII, respectively, of Fig. 7.

Referring to Fig. 1 of the drawings a brake hanger 1 is shown suspended from a bracket 2 connected to the side frame 3 of a freight car truck. The lower end of the hanger supports a brake head 4 by which the brake shoe 6 is carried. As shown more clearly in Figs. 2 and 3, the brake head is provided with a transverse opening 7 which receives the lower cross member 8 of the hanger. The upper wall of this opening rests on the upper bearing surface 9 of cross member 8, that is, the bearing surface that faces inwardly of the hanger.

It is a feature of this invention that the lower cross member 8 of the brake hanger is held in the brake head in such a manner as to substantially eliminate vibration between them so that wear of the engaging surfaces will be reduced to a minimum. This is accomplished by resilient means associated with the head and hanger for holding the head down on the hanger cross member at all times. For this purpose the brake head is provided directly below the hanger with a recess 11, the upper end of which opens into transverse opening 7. Compressed in this recess between the brake hanger and a bottom plate 12 that closes the lower end of the recess is a pair of coil springs 13 which thereby hold the head down on cross member 8. It is desirable to separate the springs from the cross member by means of a bearing block 14 engaging the lower surface of cross member 8. This block is slidable in recess 11 in which it is positioned and retained by means of laterally and downwardly projecting extensions 16 beneath shoulders 17 formed at the upper end of recess 11.

When cross member 8 is inserted in brake head opening 7 and turned to its proper position (Fig. 2) it presses bearing block 14 down against the resistance of coil springs 13. Consequently, the upper surface of opening 7 and upper surface 9 of cross member 8 are constantly biased toward each other and held firmly together at all times so that the hanger can not vibrate in the brake head and wear the engaging surfaces.

Figs. 4 to 6 illustrate the invention as applied to passenger car trucks. In such trucks the brake hanger 21 resembles a lever pivoted to the side frame at its upper end and connected to the hanger on the opposite side of the truck by a tie rod 22 passing through its lower end. This tie rod constitutes the lower cross member of the hanger by which the brake head 23 is supported. The brake head is bifurcated for receiving the lower end of the hanger, and is provided with transverse openings through which cross member 22 extends.

In accordance with this invention the clearance between cross member 22 and the brake head is taken up by means of a coil spring 24 disposed in a recess 26 in the head directly below the hanger. This recess is open at its upper end so that a bearing block 27 may project from the recess into engagement with the lower end of the hanger. Coil spring 24 is compressed between the bottom of this block and the top of a bottom plate 28 which closes the lower end of recess 24. The coil spring biases the bearing block 27 against the bottom of the brake hanger, whereby cross member 22 is held firmly against the upper surfaces of the brake head openings through which it passes.

My invention, as embodied in the brake hanger bracket of a freight car truck, is illustrated in Fig. 1 and in greater detail in Figs. 7 to 12. Referring to Figs. 7 and 10, a bracket 2, which is adapted to be connected to a railway truck side frame in any suitable manner, is provided with laterally projecting upper and lower spaced jaws or walls 32 that form an opening 33 open on three sides. This opening is for the purpose of receiving the upper yoke or cross member 34 of brake hanger 1. To prevent the hanger from wearing the bracket, a substantially U-shaped wearing shoe or wear-plate 36 is detachably mounted in opening 33 with its inner end provided with a concave hanger seat 37. The wear-plate is preferably provided near the outer end of its lower portion with down turned flanges 38 that overlap the underlying portion of the bracket in order to aid in centering the shoe in the opening and to prevent the side arms of the hanger from wearing the bracket. To lock the wear-plate in the bracket opening, its upper and lower portions are provided with aligned holes 41 which register with similar holes 42 in the upper and lower walls of the bracket. A suitable retaining member 43 is detachably disposed in these four holes.

It is a feature of this invention that the hanger and wear-plate are held in the bracket opening in such a manner as to substantially eliminate vibration between them, and consequent wear of their engaging surfaces. This is accomplished by means of a resilient member associated with the bracket and plate for holding the hanger and plate firmly against their supporting surfaces at all times. As shown in Fig. 9, the resilient member is preferably in the form of a generally U-shaped spring plate which receives the wear-plate between its upper and lower legs 46 and 47. The lower leg extends into a recess 48 in the lower surface of the wear-plate behind its lower fastener hole 41 and beneath seat 37 so that the spring plate does not raise the wear-plate off the lower bracket wall (Figs. 9 and 12). The upper leg of the spring plate preferably extends out to approximately the end of the upper bracket wall to increase its resiliency and is therefore provided with a hole 49 in line with holes 41 and 42 to permit fastener 43 to extend therethrough. The outer portion of the uppermost surface of the wear-plate has a longitudinal recess 51 therein receiving upper leg 46 of the spring plate (Figs. 8, 9, 10 and 11) so that the latter does not prevent the wear plate from engaging the upper bracket wall. As shown in Fig. 9, leg 46 and the wear-plate are provided with cooperating shoulders 52 that hold holes 41 and 49 in line while the spring and plate are being driven into bracket opening 33.

To permit the spring plate to bear against the top of upper cross member 34 of the brake hanger as well as against upper wall 32 of the bracket, the portion of the wear-plate above its brake hanger seat is provided with an opening 56 (Figs. 8, 9, and 12) that also extends through the upper portion of the wear-plate back wall. As shown in Fig. 9, the inner portion of the upper leg of the spring plate is bent downwardly through this opening for engaging the top of the hanger cross member, and is provided with a curved lower bearing surface for the cross member. In its normal undistorted form this downwardly bent portion is spaced from seat 37 a distance less than the thickness of the hanger cross member, as indicated by broken lines in Fig. 7, and the outer portion of the upper leg rests flat on the wear-plate. Consequently, when the hanger is seated on the wear-plate and turned to its proper position, it distorts the upper leg of the spring plate upwardly to the position shown in Figs. 7 and 9. As a result, the spring plate presses the hanger down tightly on its seat and also holds the wear-plate firmly against the lower wall of the bracket. In this way vibration and undesirable slack between the hanger and wear-plate and between the wear-plate and bracket is substantially eliminated and their period of serviceability materially prolonged.

According to the provisions of the patent statutes, I have explained the principle and construction of my invention and have illustrated and described what I now consider to represent its best embodiments. However, I desire to have it understood that, within the scope of the appended claims, the invention may be practiced otherwise than as specifically illustrated and described.

I claim:

1. The combination with a brake hanger bracket having upper and lower walls forming an opening between them, and a brake hanger having an upper cross member, of a wear-plate disposed in said opening and provided with a brake hanger seat receiving said cross member, separate resilient means disposed in said opening and bearing against said upper wall and the top of said cross member, said bracket walls and plate being provided with aligned openings, and a retaining member disposed in said aligned openings for locking the plate in the bracket opening.

2. The combination with a brake hanger bracket having upper and lower walls forming an opening between them, and a brake hanger having an upper cross member, of a wear-plate disposed in said opening for supporting said cross member, and a spring plate having spaced upper and lower legs disposed in said opening, one portion of the upper leg of said spring plate bearing against said upper wall of the bracket and another portion of said leg bearing against the top of said cross member.

3. The combination with a brake hanger bracket having upper and lower walls forming an opening between them, and a brake hanger having an upper cross member, of a wear-plate disposed in said opening for supporting said cross member, and a substantially U-shaped spring plate disposed in said opening with the outer end portion of its upper leg engaging said upper wall of the bracket and its lower leg disposed between the wear plate and the lower wall of the bracket, the inner portion of said upper leg engaging the top of said cross member and pressing it downwardly against the wear-plate.

4. The combination with a brake hanger bracket having upper and lower walls forming an opening between them, and a brake hanger having an upper cross member, of a wear-plate disposed in said opening and seated on said lower wall of the bracket for supporting said cross member, the lower surface of said plate being provided with a recess opening rearwardly, and a curved spring plate disposed in said bracket opening with its lower portion disposed in said recess and its upper portion compressed between the top of said cross member and said upper wall of the bracket.

5. The combination with a brake hanger bracket having upper and lower walls forming an opening between them, and a brake hanger having an upper cross member, of a substantially U-shaped wear-plate disposed in said opening for supporting said cross member, the upper portion of said wear-plate being provided with an opening therethrough, and resilient means extending through said wear-plate opening and bearing against said upper wall and the top of said cross member.

6. The combination with a brake hanger bracket having upper and lower walls forming an opening between them, and a brake hanger having an upper cross member, of a substantially U-shaped wear-plate disposed in said opening for supporting said cross member, the upper portion of said plate being provided with an opening therethrough, and a substntially U-shaped spring plate disposed in said bracket opening with its lower portion disposed between said wear-plate and the lower wall of the bracket, the upper portion of said spring plate extending through said wear-plate opening and being compressed between the top of said cross member and the upper wall of the bracket.

7. The combination with a brake hanger bracket having upper and lower walls forming an opening between them, and a brake hanger having an upper cross member, of a substantially U-shaped wear-plate disposed in said opening and provided with a seat receiving said cross member, the upper portion of said plate being provided with an opening therethrough, and a substantially U-shaped spring plate disposed in said opening with its lower portion between said wear-plate and the lower wall of the bracket, the upper surface of said wear-plate being provided with a longitudinal recess, and the upper portion of said spring plate extending through said wear-plate opening and into said recess, whereby it engages said upper wall and the top of said cross member and biases them apart.

8. A brake hanger wear-plate in the form of a substantially U-shaped member provided with a brake hanger seat, the upper portion of the plate being provided with an opening adapted to receive resilient means compressed between a brake hanger and the upper wall of a hanger bracket.

9. A brake hanger wear-plate in the form of a substantially U-shaped member provided with a brake hanger seat, the upper portion of the plate directly above said seat being provided with an opening adapted to receive resilient means compressed betwen a brake hanger and the upper wall of a hanger bracket.

FREDERIC SCHAEFER.